Dec. 23, 1924.

R. O. BERG ET AL

TUBE WELDING MACHINE

Filed July 28, 1922  5 Sheets-Sheet 1

1,520,221

Inventors
Richard O. Berg
Simon Berg
By Stuart C. Barnes
Attorney

Dec. 23, 1924.

R. O. BERG ET AL 1,520,221

TUBE WELDING MACHINE

Filed July 28, 1922

Inventors
Richard O. Berg
Simon Berg

By Stuart C. Barnes
Attorney

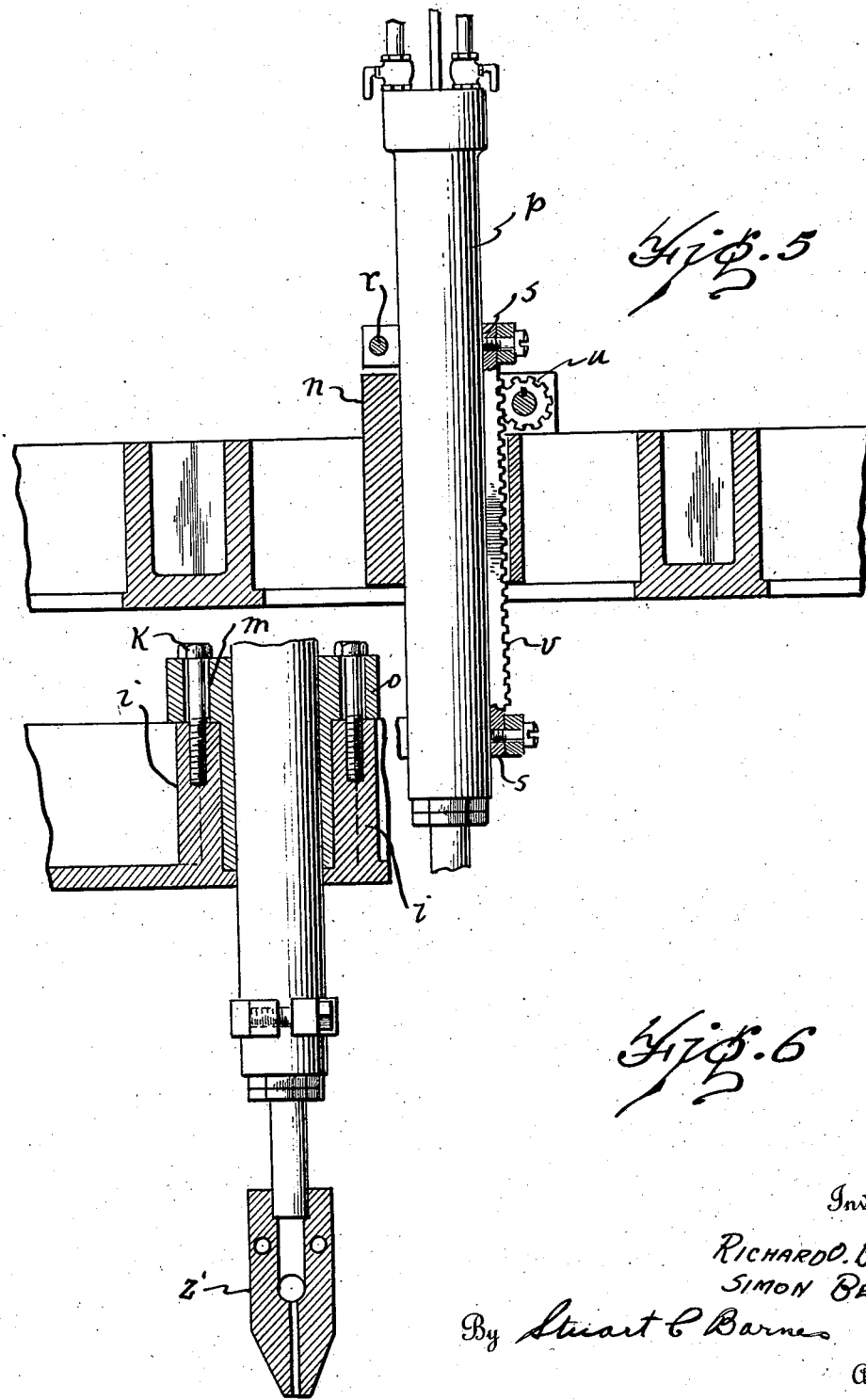

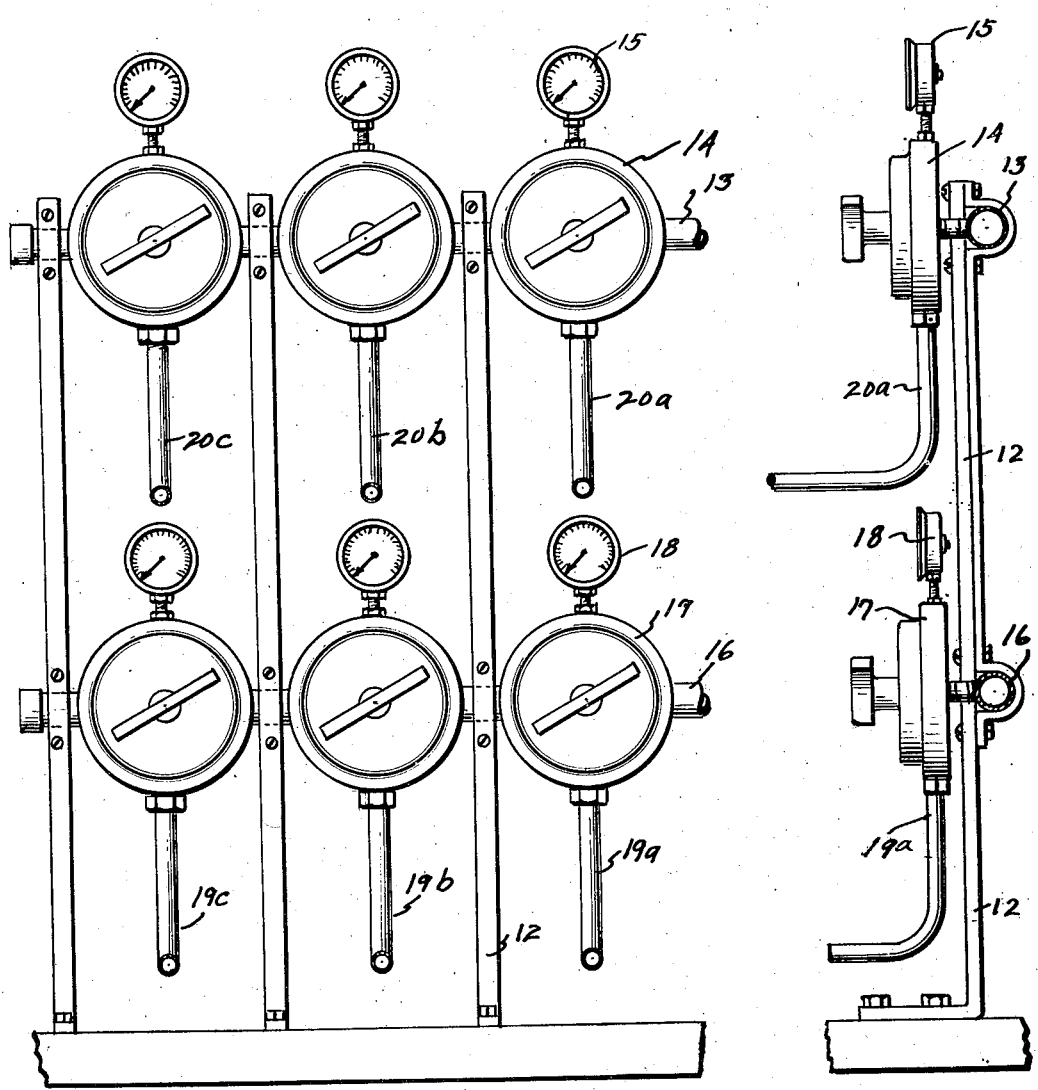

Patented Dec. 23, 1924.

1,520,221

UNITED STATES PATENT OFFICE.

RICHARD O. BERG AND SIMON BERG, OF DETROIT, MICHIGAN, ASSIGNORS TO MICHIGAN STEEL TUBE PRODUCTS COMPANY, OF DETROIT, MICHIGAN, A CORPORATION OF MICHIGAN.

TUBE-WELDING MACHINE.

Application filed July 28, 1922. Serial No. 578,065.

*To all whom it may concern:*

Be it known that RICHARD O. BERG and SIMON BERG, citizens of the United States, residing at Detroit, in the county of Wayne and State of Michigan, have invented certain new and useful Improvements in Tube-Welding Machines, of which the following is a specification.

This invention relates to tube welding machines and has for its object a tube welding machine designed to weld rapidly relatively large tube of heavy gauge, such for instance as $2\frac{3}{16}$ and 10-gauge, used for automobile propeller shaft housings and for rear axle housings. Heretofore it has been impossible to weld tube as large as this at satisfactory continuous speed by the oxyacetylene process.

It is the object of the present invention to afford a machine that can accomplish welding of this nature and which is nicely controllable to secure the best welding effects.

In the drawings,—

Fig. 5 is a fragmentary vertical longitudinal section through the torch support, taken on the line 5—5 of Fig. 2.

Fig. 6 is a fragmentary vertical cross section through a portion of the torch support showing both the torch and tip.

Fig. 7 is a front elevation of the pressure gauges and pressure controls on the top of the feed roll block.

Fig. 8 is a side elevation on the same.

Figure 1:
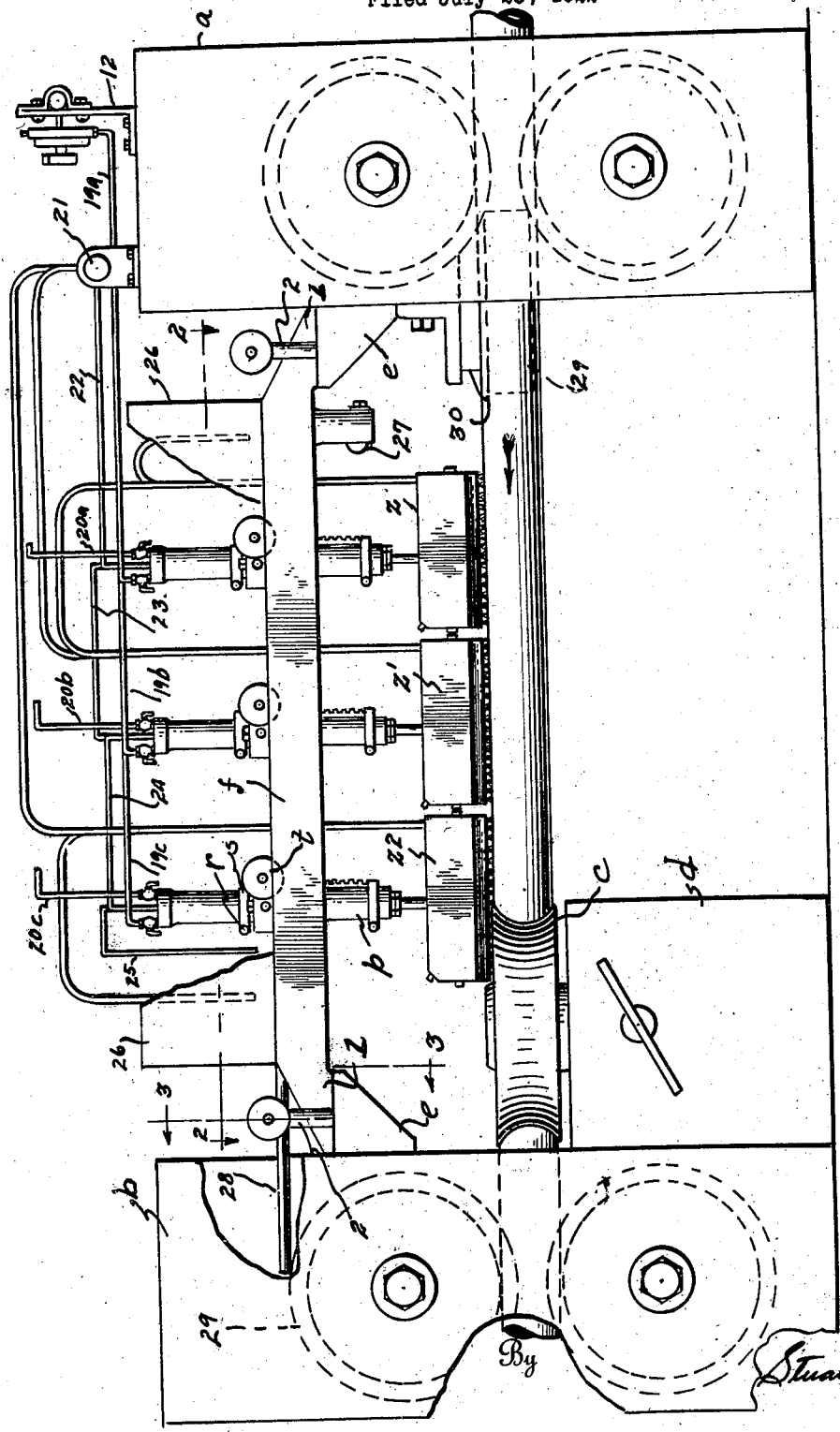
Fig. 1 is a side elevation of the machine.

Referring to Fig. 1, $a$ designates a feed roll block in which the feed rolls are supported in any suitable manner. $b$ is a second block containing rolls which serve to pull the tube along. $c$ represents the sliding or pinch rolls supported in suitable bearings $d$. It has been thought unnecessary to detail the sliding blocks for the feed rolls, the dovetails, etc., to give suitable adjustment and alignment. These features are all well known and in common use in this art.

Figure 2:
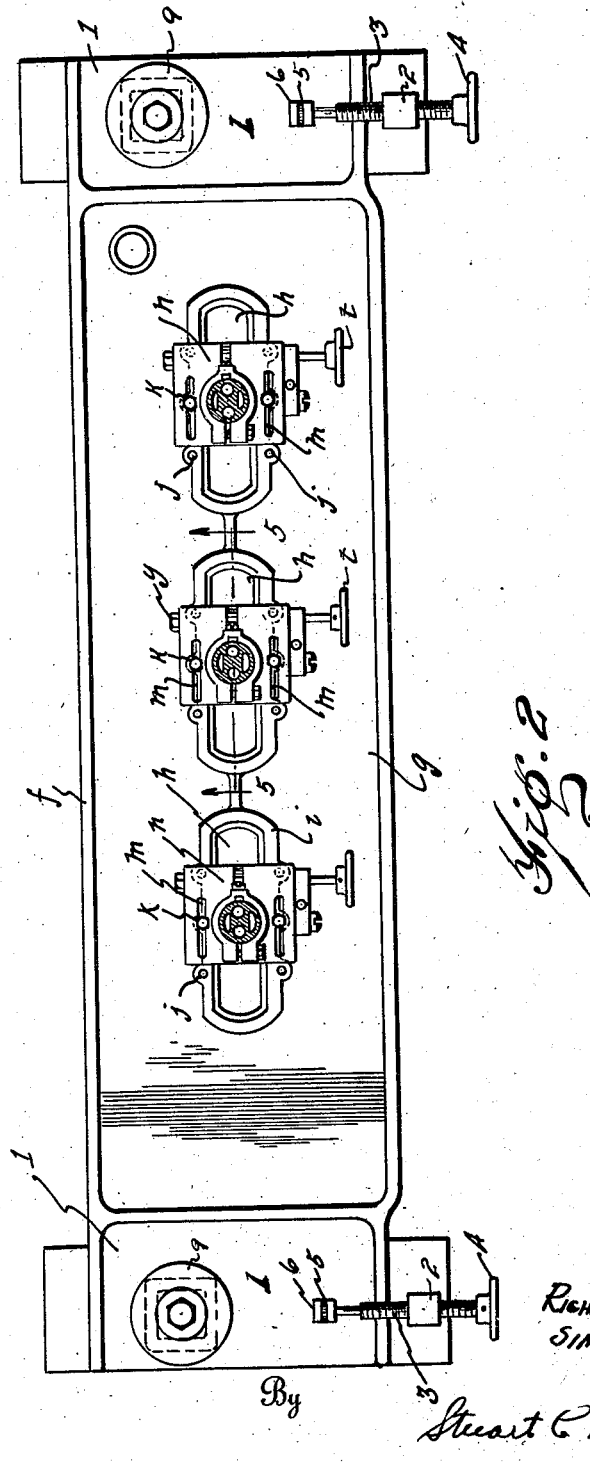
Fig. 2 is a plan view of the torch support, taken on the line 2—2 of Fig. 1.
Figure 3:
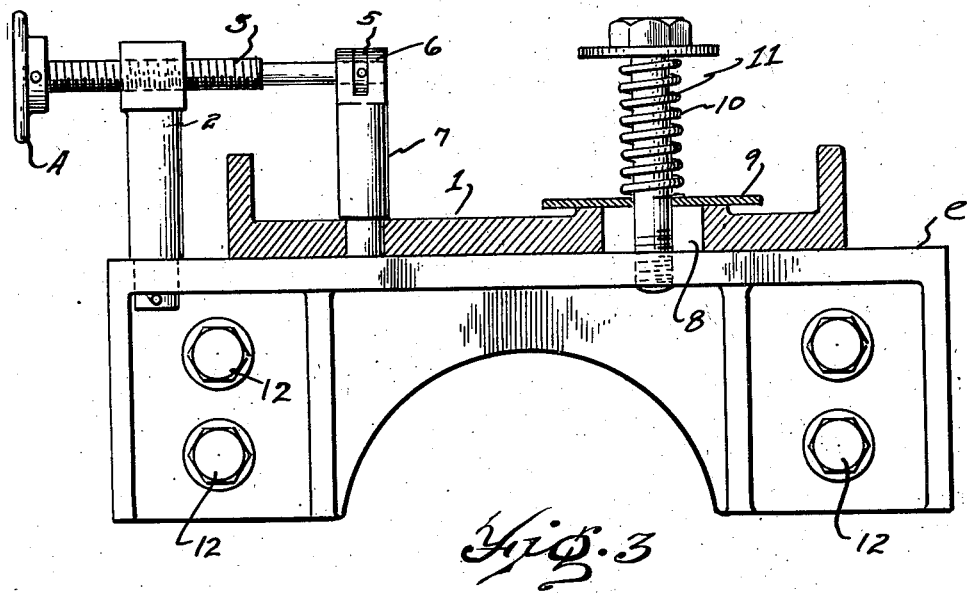
Fig. 3 is a section taken on the line 3—3 of Fig. 1.
Figure 4:
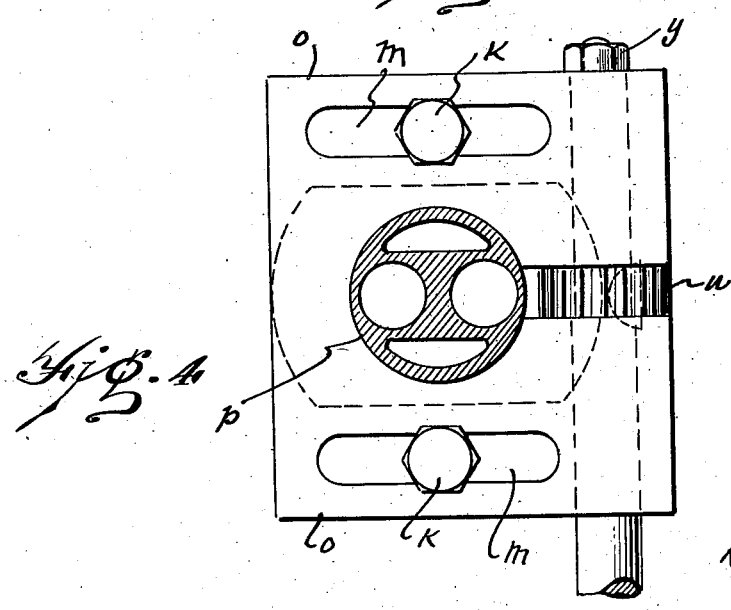
Fig. 4 is an enlarged plan view of one of the torch slides, showing a cross-section of the torch.

Supported on the roll blocks or bearings $a$ and $b$ are the brackets $e$. These brackets form the rests on which the opposite ends of the torch support and pan $f$ are supported. A plan view of this supporting pan is shown in Fig. 2. This is a casting forming a shallow water chamber or tray $g$. This tray is provided with elongated slots $h$ which are protected by high walls $i$ so that the water cannot escape through the slots. These walls $i$ have on each side bolt holes $j$ to receive bolts $k$ that run through the slots $m$ of the torch supporting slides $n$. The slide in a vertical cross section is roughly a T-shape (Fig. 6) with the over-hanging sides $o$ provided with the slots $m$. These over-hanging portions are adapted to ride on the walls $i$ which surround the center slots in the pan or torch support. Bolts $k$ can be inserted in any one of the three pairs of bolt holes $j$, consequently the torch-supporting slides due to the three bolt hole adjustment and due to the elongated slots $m$, can be nicely adjusted at any point along the slot. This is true of each one of the torch slides, there being three in number.

A vertical adjustment of each torch $p$ can be had. The torch body slides through the vertical opening in the slide $n$. Clips $s, s$, are clamped around the upper and lower portions of the torch and carry the rack bar $v$. This rack bar is engaged by the teeth of the pinion $u$ which can be turned by the hand wheel $t$, when the jam nut $y$, is loosened. This will raise and lower the torch and tip $z$ with respect to the work.

The torch support or water pan has extended ends 1 which are arranged to rest on the rests $e$. These rests are provided with upright posts 2 through which is threaded screws 3, operated by the hand wheels 4. On the ends of each of these screws is pinned or otherwise secured a washer or ring 5, held between the forks 6 of the post 7. This post 7 rises through the end 1 of the torch support. Slots 8 are provided in the end of the torch support. Over this slot is a plate 9 held against the slot walls by the coil spring 10 around the cap screw 11. This cap screw screws into the end of the rest $e$ which is a casting provided with the cap screws 12 by which it may be bolted to the roll block. This spring 10 is a relatively stiff spring which introduces considerable friction between the base of the end of the torch support and upper face of the rest, consequently tends to hold the torch support in any adjustment on the face of the rest that may be secured by manipulating the hand wheel 4 and screws 3. These devices just described constitute the means for shifting either end of the torch support laterally or both ends laterally together.

The torch tips $z^1$ and $z^2$, arranged and controlled in a way to be described, are one of the generic features of this invention. We are aware that it is old to use a plurality of torches in a welding tube, or plurality of welding jets issuing from a single tip. However, so far as we know, no one has heretofore arranged a plurality of multiple jet torch tips so as to form them into preheating and welding jet groups which have both controllable adjustment as to location and oxygen and acetylene gas supply. Each one of these tips $z$ $z^1$ and $z^2$ is a relatively long tip provided preferably with jet openings for 19 flames. However, we do not limit our invention to any specific number of flames. The idea is to provide one or more relatively long welding tips $z^1$, that are used for preliminary heating and one relatively long welding tip $z^2$ which is used for the actual welding or fusion of the metal. This arrangement is very important as it makes it possible to adjust the apparatus to different thicknesses of tube and gauge of tube with very little effort. The preliminary heating jets which issue through the tips $z^1$ are provided with oxygen usually maintained at about 9 lbs. pressure and acetylene gas at about 5 lbs. pressure. These are the most suitable pressures to work with in preliminary heating of tube. It is not so essential that accurate regulation take place with these preliminary heating jets and they can be maintained at substantially constant pressures, although the character of the tube may vary. However, with the welding jets issuing from the welding tip $z^2$, it is important that the pressures be just right to get proper penetration of the heat without unusual burr on the inside of the tube or blow holes in the tube. This is accomplished by suitable regulation of this tip. It will be found that the oxygen pressure will vary between 9 and 15 lbs. and the acetylene pressure between 5 and 9 lbs. depending on the tube that is being welded.

This regulation is afforded by means of the gauges and pressure regulating members shown in Fig. 7. These are all collected on the stand 12 on top of the feed roll block a. This stand supports an upper acetylene main 13 which connects with a pressure regulator 14 provided with a gauge 15. One pressure regulator and one gauge for each torch. Similarly, an oxygen main 16 connects with pressure regulator 17 and gauge 18. Conduits $19^a$, $19^b$ and $19^c$ lead from the three pressure regulators to the three separate torches and similar conduits $20^a$, $20^b$ and $20^c$ lead from the separate acetylene pressure regulators and gauges to each of the torches. This permits the operator to nicely regulate the pressures for both the oxygen and acetylene gases for each torch from a single location.

Water enters the machine through the main 21, runs to the first torch through the hose 22, circulates through this torch and is carried to the next torch through the hose 23, circulates through this torch and is carried to the third torch through the hose 24. The water circulates through the third torch, then issues out through the pipe 25 and drains into the water tray or torch support, here it acts to cool the intense heat generated by some 59 oxy-acetylene jets. Without this water cooling, the heat would be very destructive to the torches notwithstanding that each torch is water cooled and would also make it very difficult to operate the apparatus because of the intense heat. A shield 26 is provided to enclose the sides of the torches and shield them against the heat arising from the oxyacetylene jets. The overflow water runs out of the pan at one end through the depending tube 27 and runs out as an overflow at the other end through the pipe 28 which discharges over the draft rolls 29 to keep them cool. The torch tips are also preferably water-cooled and drain into the water tray.

The tube seam is guided to the jets by a mandril 29 and a fin 30.

What we claim is:

1. In a tube welding machine, the combination of a plurality of tips, a common support for the tips capable of adjustment and carrying all the tips, and separate means on said support for adjusting each tip with respect to the work.

2. In a tube welding machine, the combination of a plurality of tips, a common support for the tips, and means for shifting the end of said support laterally.

3. In a tube welding machine, the combination of a plurality of tips, a common support for said tips, and means for shifting either or both ends laterally to vary the welding line of the tips.

4. In a tube welding machine, the combination of a plurality of multiple jet tips with the jets linearly arranged, a common support for all the tips, means for shifting said support laterally to vary the lateral adjustment of the welding line, and means carried on said support for supporting each individual tip and permitting vertical adjustment of each tip with respect to the work.

5. In a tube welding machine, the combination of a plurality of multiple flame jet tips with the jets linearly arranged, a common support for all the said tips, means for shifting said support laterally to adjust the lateral disposition of the welding line, and means on this common support for supporting each tip and permitting a longitudinal adjustment of each tip in the welding line.

6. In a tube welding machine, the combination of a plurality of multiple flame jet tips having the jets arranged linearly in alignment, a common support for the said tips, means for shifting said support laterally to vary the lateral disposition of the welding line, means on said support for adjusting each tip vertically with respect to the work and means on said support for adjusting each tip longitudinally with respect to the welding line.

7. In a tube welding machine, the combination of a plurality of multiple flame jet tips, and a water cooled common support for all of the said tips.

8. In a tube welding machine, the combination of a plurality of multiple flame jet tips and a common support for all of said tips formed to provide a water pan.

9. In a tube welding machine, the combination of a plurality of multiple flame jet tips and a common support for said tips formed to provide a water pan and deflectors secured on the sides of the water pan.

10. In a tube welding machine, the combination of a plurality of multiple flame jet tips, a common support for all the said tips comprising a bridging member provided with slots permitting longitudinal adjustment of the tips and rests for supporting the ends of the bridging member of the support.

11. In a tube welding machine, the combination of a plurality of multiple flame jet tips, a torch for each tip, a common support for the torches comprising a bridging member provided with longitudinal slots in which the torches are longitudinally adjustable and rests for the ends of the bridging member.

12. In a tube welding machine, the combination of a plurality of multiple flame jet tips, a torch for each tip, a common support in the form of a web member provided with longitudinal slots, slides for supporting each torch and adjustable along the walls of each slot to vary the longitudinal adjustment of the tips and means for supporting the bridging member.

13. In a tube welding machine, the combination of a plurality of multiple flame jet tips, a torch support comprising a web member provided with longitudinal slots, a slide on each slot for carrying and adjusting the torch, means for adjusting the torch vertically on the slide, and means for adjusting the slide along the slot.

14. In a tube welding machine, the combination of a plurality of multiple flame jet tips, a torch for each tip, a torch support in the form of a web member provided with longitudinal slots, a slide provided with a pinion and rack vertical adjustment for the torch, and means by which the torch may be clamped at various points along the slots to provide a longitudinal adjustment of the the torch.

In testimony whereof we affix our signatures.

RICHARD O. BERG.
SIMON BERG.